350-6.3 SR
XR 3,120,577
SEARCH ROO
CROSS REFERENCE
6-1

Feb. 4, 1964 C. J. T. YOUNG 3,120,577

SCANNING SYSTEM

Filed Dec. 2, 1960 4 Sheets-Sheet 1

INVENTOR.
CLINTON J.T. YOUNG
BY
Marechal, Biebel, French & Bugg
ATTORNEYS

3120577
OR IN 178/6.7R

Feb. 4, 1964 C. J. T. YOUNG 3,120,577

SCANNING SYSTEM

Filed Dec. 2, 1960 4 Sheets-Sheet 2

*INVENTOR.*

CLINTON J.T. YOUNG

BY

*Marechal, Biebel, French & Bugg*

ATTORNEYS

Feb. 4, 1964 C. J. T. YOUNG 3,120,577

SCANNING SYSTEM

Filed Dec. 2, 1960 4 Sheets-Sheet 3

INVENTOR.

CLINTON J.T. YOUNG

BY

Marechal, Biebel, French & Bugg

ATTORNEYS

INVENTOR.
CLINTON J.T. YOUNG
BY
Marechal, Biebel, French & Bugg
ATTORNEYS

United States Patent Office 3,120,577

Patented Feb. 4, 1964

3,120,577
SCANNING SYSTEM

Clinton J. T. Young, Alexandria, Va., assignor to Outlook Engineering Corporation, Alexandria, Va., a corporation of Virginia Filed Dec. 2, 1960, Ser. No. 73,282
14 Claims. (Cl. 178—6.7)

This invention pertains to duplicating systems and more particularly to a system and method for reproducing the features of a relatively flat surface by optical scanning.

This invention provides apparatus and method by means of which the optically discernible details on a surface, such as the printing on a map, may be recognized, and reproduced if desired, at a high rate of speed and with accuracy. Broadly stated, this invention provides apparatus for scanning a surface to read out the marking or surface details and further for forming a facsimile thereof by recording in two dimensions without the necessity of intermediate storage of the read-out information. It is particularly useful as a device for making duplicate maps and the like from a master copy.

A known system for scanning a surface consists of bending the material to be copied onto a cylinder and spinning the cylinder on its axis while recording from the surface of such cylinder. However, this arrangement has certain distinct disadvantages for extreme accuracy in that the recording medium must also be mounted in the same way as the material being copied and this requires the use of a recording medium which can be bent into a cylinder. Necessarily, error results in variations in diameter between the two cylinders and centrifugal force complicates the problem of holding the material being copied and the recording medium.

Electronic scanning has the disadvantage of being difficult to calibrate and hold in calibration. In such electronic systems, it is usually necessary to project a reduced image of the surface being copied onto the face of a tube, wherein distortion may result.

This invention substantially eliminates or reduces these problems by employing a system of band scanning in which the area to be duplicated is covered as a series of parallel bands, and the actual scanning pattern being a raster of fine transverse lines whose length is approximately the same as the width of the band. The rapid scanning over a narrow band provides a combination of speed and accuracy which is hard to achieve by conventional scanning methods. The scanning lines are sufficiently short so that the fine raster can be scanned by means of an optical arrangement at high speed with accuracy and high resolution.

The apparatus consists generally of a reading head and a recording head which are preferably combined into a rigid structure which moves on a transverse track, called a main way, so that movement along the main way is the same for both heads. Progressive advance from one fine scanning line to the next is provided by bodily advancing the heads together along the length of the path. When a given path has been completed, the track or main way on which the heads move is shifted by the width of one band so that an adjacent band will be covered in the next passage of the reading head.

Reading is done by illuminating the subject generally, forming an image of the subject, and defining a small element in this image. It is within the scope of this invention to illuminate with a small spot of light, and to detect the surface quality illuminated by a transducer adjacent the surface. Such arrangements may be subject to the effects of stray light and are less efficient.

Recording is preferably done by modulating a moving beam of light falling on a photosensitive film or plate which is arranged to lie approximately in the same plane as the material being copied, and to one side of this material. Since the reading and recording heads form a rigid structure which moves on a common track, the movement along the track is the same for both heads.

The general arrangement of the device as outlined above makes it possible to make an instrument which is insensitive to variations in temperature. The surfaces upon which the reading and recording material are mounted can be connected by a material which has substantially the same coefficient of thermal expansion as the connection between the reading and recording heads so that changes in separation between corresponding points in the two surfaces is matched by an equal change in separation of the two heads.

The optical scanning system by means of which the fine lines are traced consists generally of an objective lens, a rotating structure carrying a number of reflecting surfaces, a second lens, and an aperture to define the element of the scan. An optically equivalent scanning structure is contained within the recording head and is driven in synchronism with the rotating structure within the reading head. The rotating portions of the system preferably include a plurality of reflectors mounted for rotation on a wheel with reflection taking place on the side of the reflectors toward the center of rotation. Thus, in the reading head, the light is incident to the reflecting surfaces from the side toward the center of rotation. These reflecting surfaces are preferably set at an angle to the radius of the wheel so that the reflected light is outside of the circle swept by the reflectors. It has been found that this arrangement effects a substantial reduction in the dead time between the effectiveness of successive reflecting surfaces in defining a scan as compared to the employment of a rotary prism.

The optical system in the recording head is similar to that described in connection with the reading head except that the light travels in substantially a reverse path originating from a modulated light source and applied to the recording material with a rapid transverse scanning motion. In each instance, the rotating reflecting surfaces are arranged to pass successively through a beam formed from a lens, which beam carries an image preferably formed at infinity so that the change in length of light path by the moving reflecting surfaces has no effect upon the focusing of the image.

It is therefore a principal object of this invention to provide apparatus as outlined above for the accurate and rapid scanning of a surface.

Another object of this invention is to provide a facsimile duplicating system as outlined above including a rotating wheel with reflectors thereon which have reflecting surfaces arranged to pass through a beam of the surface being scanned with the light incident to a side toward the axis of rotation and arranged to reflect the light outwardly of the radius of the reflecting surfaces.

A further object of this invention is to provide apparatus as outlined above for effecting the rapid scan of a surface including a rotating reflector structure having reflecting surfaces which are arranged to pass through a beam carrying an image formed at infinity together with a dissecting aperture defining a small element of such image.

A further object of this invention is to provide apparatus as outlined above having rigidly interconnected scanning and recording heads arranged for concurrent movement over a reading and recording area with each of the heads containing uniformly driven optical scanning apparatus for effecting a rapid transverse scan of the area in narrow bands of areas.

A still further object of this invention is to provide apparatus as outlined above for scanning a defined area of a surface including a pick-up lens positioned to form an image of the surface at infinity, illuminating the surface generally, and defining an element in this image by means of a rotating mirror wheel and a dissecting aperture.

Another object of this invention is to provide a method of scanning the surface of an object and forming a moving element thereof.

Other objects and advantages of the invention will be apparent from the following description, the accompanying drawings and the appended claims.

In the drawings—

Figures 1, 2, 3:
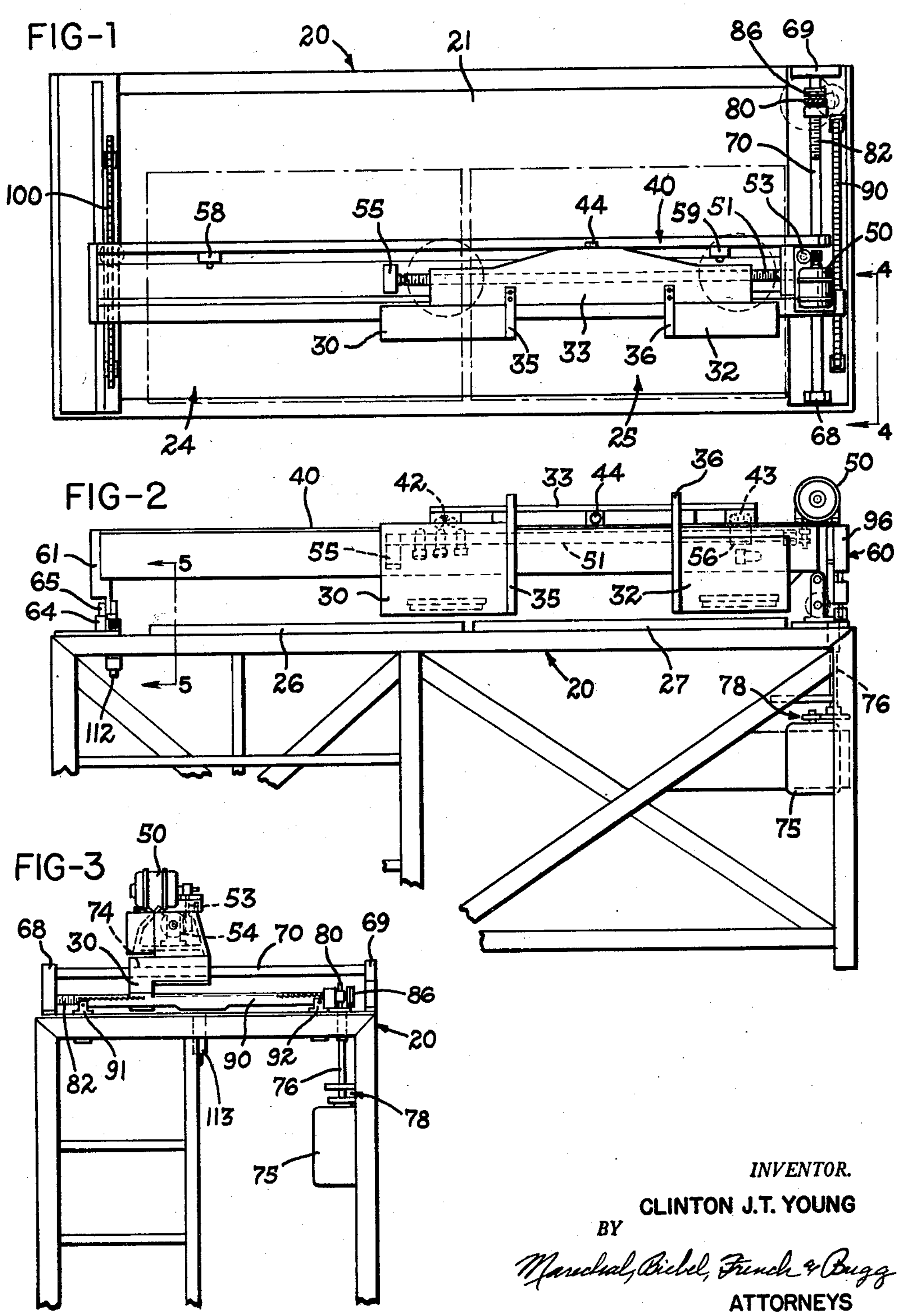
FIG. 1 is a plan view of a scanning and duplicating machine constructed according to the teachings of this invention.
FIG. 2 is a front elevational view of the machine of FIG. 1.
FIG. 3 is a right end elevational view of the machine of FIG. 1.

Referring to the drawings, which illustrate a preferred embodiment of this invention, a table is illustrated at 20 which is constructed of a metal framework providing a generally flat and sturdy upper surface 21. A major portion of the surface 21 of the table 20 is divided into a scanning or reading area 24 and a recording or duplicating area 25. Material which is to be duplicated by the apparatus of this invention is placed on the recording area 24 and is preferably held flat on a vacuum frame 26 which forms a part of the recording area 24. Such material may be covered with a clear sheet of plastic material, as desired, in order to protect the surface thereof against possible damage during reading.

The recording area 25 similarly includes a vacuum frame 27 which operates to hold a recording medium in place in a preferred flat plane. The recording medium may consist of any light responsive material or surface and preferably consists of a plate or sheet of photographic film, although it is within the scope of this invention to employ other recording material, such as photolithograph plates and the like. It is preferred that the material at the recording and reading areas 24 and 25 lie in a coplanar relationship, although it is also within the scope of this invention to provide for reading and recording in vertically separated planes.

The table 20 serves to fix the horizontal spaced apart relationship of corresponding points on the reading and recording areas. Therefore, the table 20 is preferably formed of the same material throughout in order to equalize the effects of expansion throughout. It is also desirable that the material being copied at the area 24 and the recording medium at the area 25 follow the dimensional changes of the apparatus. The vacuum frames 26 and 27, when employed with paper or other non-rigid material at the areas 24 and 25, insure that such material will not change size with humidity and will follow the table in any thermal change in size.

Means for reading out information on the material at the recording area 24 by scanning includes a scanning or reading head 30 which is rigidly interconnected with a recording head 32 by means of a connecting carriage or bar 33. The reading head 30 is suspended from the bar 33 by a support or hanger bar 35, and the recording head 32 is suspended from the bar 33 by a similar hanger bar 36. The carriage bar 33 is preferably formed of the same material as the table 20 so that any thermal changes in the spaced apart distances of the heads 30 and 32 is matched by similar change in the spaced apart distances of corresponding points on the areas 24 and 25. If a higher degree in the reduction of the effects of thermal expansion is desired, the vacuum frames 26 and 27 may be attached to the frame of the table 20 at two points corresponding to the spaced apart distance of the heads on the bar 33 so that the thermal changes therebetween will be substantially uniform.

Figures 8, 9:
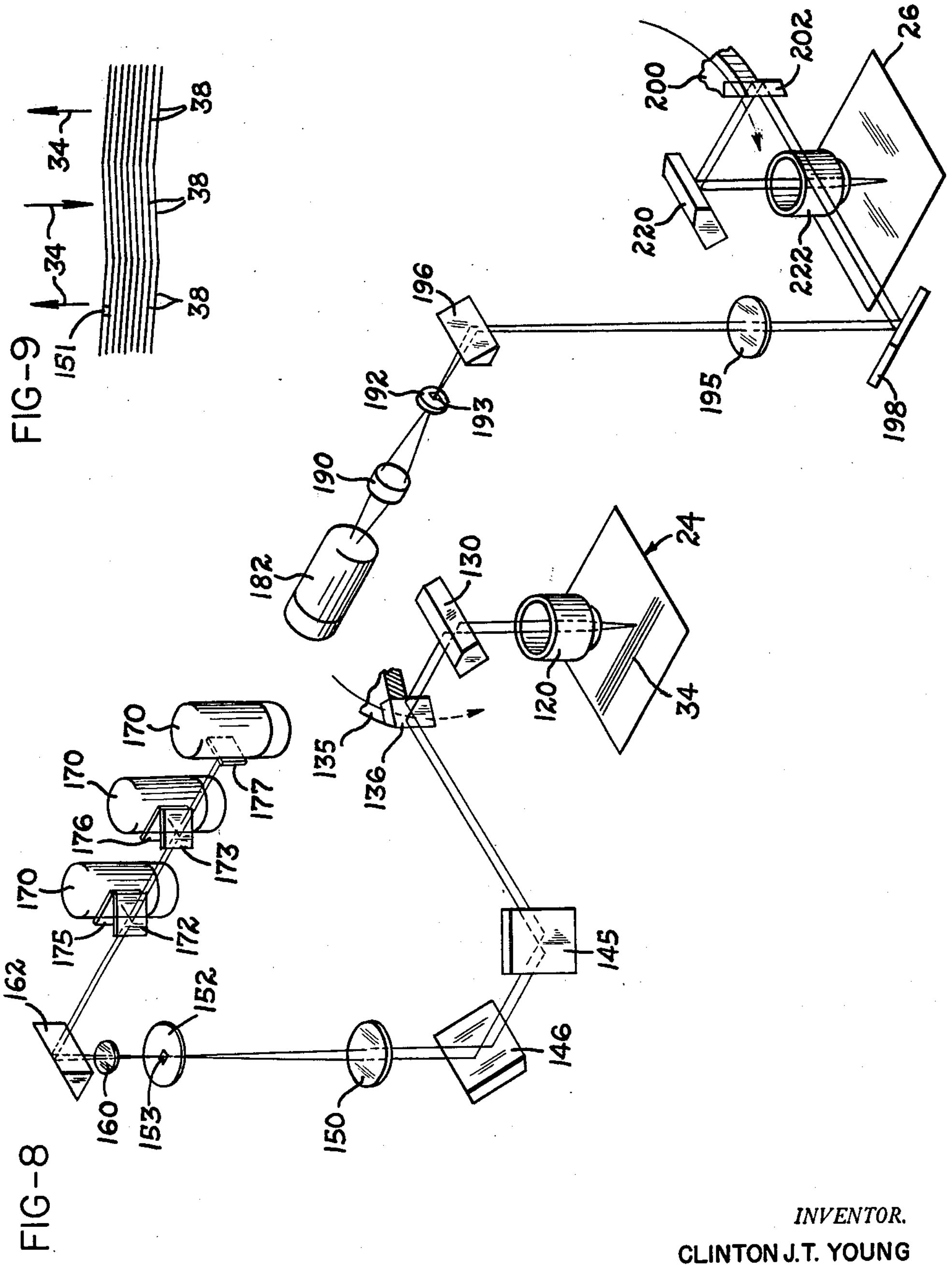
FIG. 8 is an isometric view of the reading and recording scanning optical system of this invention.
FIG. 9 is an enlarged view of a fragment of the scanning pattern traced by this invention.

The invention includes means for causing the reading head 30 to cover the recording area 24 in bands, and these bands preferably consist of a series of parallel paths 34 (FIG. 8). The actual scanning pattern consists of a raster of fine lines 38 (FIG. 9) transverse to the bands 34 and the length of these lines are approximately the same width as the bands. Band scanning is therefore effected by moving the reading and recording heads to move in such a manner as to traverse the respective reading and recording areas in parallel bands. This is accomplished in this preferred embodiment by mounting the heads 30 and 32 as assembled on the bar 33 on a traverse carriage or track 40 which is called the main way, and which may conveniently consist of the track of an optical bench. As is shown in FIG. 3, the track of the main way 40 forms a V in the front and has a flat riding surface at the upper rear. The carriage formed by the connecting bar 33 includes pairs of rollers 42 and 43 at opposite ends thereof which are inclined at an angle to ride within the V of the main way 40. The bar 33 further includes a center roller 44 which rides on the flat surface portion of the main way 40.

Means for causing the reading and recording heads to travel from side to side on the main way 40 includes a main way motor 50 which drives a lead screw 51 through a short vertical shaft 53 (FIGS. 1 and 3) which has threads which engage a helical gear 54 (FIG. 3) forming a part of the lead screw 51. The remote end of the lead screw 51 is carried for rotation within a bearing block 55 secured to the main way 40. Driving connection between the bar 33 and the lead screw 51 is effected by means of a nut 56 arranged in depending relation from the bar 33 adjacent the right-hand end thereof. Adjustable means for limiting the extent of travel in either the left-hand or right-hand direction of the heads along the main way include a pair of limit switches 58 and 59 which may be conveniently attached to the way 40 and which may be positioned along the length thereof to be actuated at the desired limits of travel in order to conserve time when the unit is operating to scan material of smaller dimension that the maximum capabilities of the system.

Figure 5:
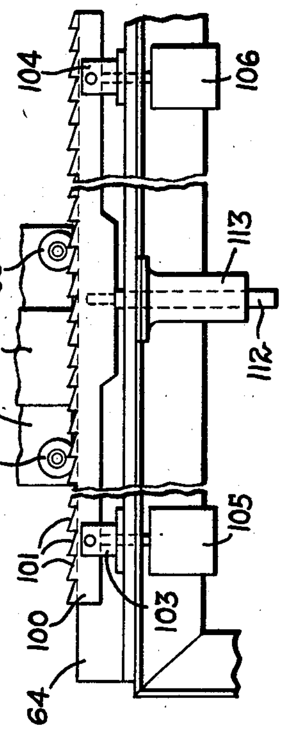
FIG. 5 is an enlarged fragmentary view of the left-hand indexing mechanism looking generally as indicated by the line 5—5 of FIG. 2.

In order to effect the scanning of the parallel bands 34, the main way 40 is bodily moved or shifted backward parallel to itself by the width of one scanned band 34 in order to effect the lateral passage of the scanning head to scan an adjacent band. Means providing for this movement of the main way 40 includes end plates 60 and 61 which are formed respectively on the right and left ends of the main way and which cooperate with crossway guide means formed on the surface 21 of the table 20. On the left-hand side, the guide means includes a flat rail 64 (FIG. 5), and the end plate 61 includes a pair of spaced apart rollers 65 and 66 arranged for rolling engagement with the rail 64.

Figure 4:
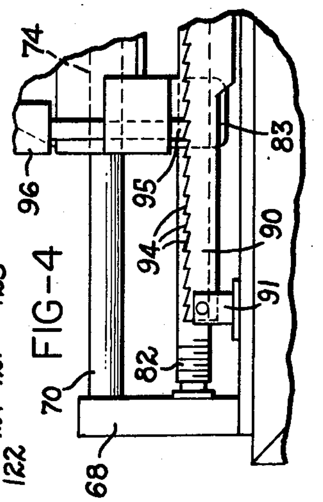
FIG. 4 is an enlarged fragmentary view of a portion of the right-hand indexing mechanism looking generally as indicated by the lines 4—4 of FIG. 1.

The guide means for the main way 40 on the right-hand side of the table 20 includes a pair of spaced apart uprights 68 and 69 (FIG. 3) between which is mounted a main way guide or support shaft 70. The end plate 60 at the right end of the main way 40 is formed with an opening indicated at 74 in FIGS. 3 and 4 which preferably includes ball bushings (not shown) for the substantially frictionless support of the main way thereon.

Means for moving the main way into positions parallel to itself includes a front-back electric motor 75 which drives a vertical shaft 76 (FIG. 3) through reduction gearing 78. A worm is formed at the end of the shaft 76 which engages a helical gear 80, as shown in FIG. 1. The gear 80 forms the driving connection to a transverse lead screw 82, the opposite ends of which are mounted for rotation within the uprights 68 and 69. The main way 40 is connected to the lead screw 82 for transverse movement therewith by means of a nut 83 (FIGS. 3 and 4) which forms an extension of the end plate 60. A clutch 86 is provided at the end of the worm shaft 82 and couples the shaft of the screw 82 to the helical drive gear and provides slippage so that the motor 75 can come to a stop without undue strain when the main way has moved into the next indexed position.

Indexing means for defining the positions of the main way from front to back includes cooperative pawl and index bars for each end of the track. The indexing means for the right-hand side of the main way is shown in enlarged detail in FIG. 4 as including an indexing bar 90 fixedly mounted at its ends on supports 91 and 92. The bar 90 includes a plurality of spaced notches 94 which define the width of the bands 34 to be scanned by the head 30 and reproduced by the head 32. The end plate 60 includes a movable pawl 95 which is normally biased into engagement with one of the notches 94 but which may be lifted out of engagement by an electric solenoid 96.

The indexing means for the left end of the main way includes another indexing bar 100 which is preferably cut concurrently with the bar 90 in order to assure equal spacing between corresponding teeth or notches 101 in the bar 100 and the notches 94 in the bar 90. The bar 100 is mounted at its remote ends on supports 103 and 104 (FIG. 5) which form an operating part of solenoid 105 and 106. The bar is normally biased upwardly by suitable spring means in the solenoids 105 and 106 into engagement with a pawl 110 forming a fixed component of the end plate 61, and is pulled downwardly for disengagement by the solenoids 105 and 106. The center of the bar 100 is guided in this movement by a pin 112 arranged to slide within a tubular bushing 113.

A rearward shift of the main way 40 is effected at the conclusion of the scanning of one of the parallel bands 34 by the engagement of the bar 33 with either one of the left or right limit switches 59 or 58. A suitable circuit may be employed to actuate the solenoid 96 and 105, and 106 in unison to disengage the indexing bars 100 and 90 from their respective pawls 110 and 95. Preferably, the front-back motor 75 is then energized to move the main way 40 backward through the lead screw 82, and the solenoids are then released after an interval long enough so that the pawls 95 and 110 will have cleared the notches with which they were engaged but short enough so that they cannot have passed the next successive notches. The front-back motor 75 may then be deenergized to coast to a stop while excess motion is taken up by slipping at the clutch 86 after the pawls 95 and 110 have engaged the notches of the indexing bars 90 and 100 for the next position. The left-right or main way motor 50 may then be energized for a lateral traverse of the heads along the way 40 in the opposite direction.

It is to be understood that the present invention is not limited to the program as described above and that other arrangements for moving the heads in relation to the material being scanned may be used. For instance, the heads may be relatively fixed in space and the material being copied and the recording material may be moved appropriately beneath their respective recording and scanning heads. Also, the copying and/or the material being copied may be rotated such as a phonograph record is rotated with the heads being moved together radially of the material by a suitable form of lead screw, to form a spiral path. Further, it is possible, but not necessarily preferable, to form the recording and/or the reading areas as cylinders which are rotated beneath their respective heads. However, such arrangements usually introduce additional errors which are obviated by the preferred embodiment of the invention described above.

It is often desired to move the heads into a given position over the material beneath the heads, and to this end provision is preferably included for manual operation. During manual operation, the solenoids 96, 105 and 106 are energized to release the engagement of the pawls 95 and 110 from their respective indexing bars 90 and 100. The motor 75 is reversible and may be operated to position the main way along the lead screw 82, as desired. Similarly, the motor 50 may be operated manually to position the heads on the bar 33 in the left-right direction, as desired.

The apparatus of this invention provides means for effecting a rapid scan of the bands being traversed by the heads. Thus, a high rate of scan is maintained in short lines 38 defining a fine raster of lines across each band (FIG. 9), while progress along the band is provided by the bodily advance of the scanning head 30 along the main way 40 by the rotation of the lead screw 51 through the motor 50. The rate at which the material is covered depends upon the resolution or detail which is desired to be gathered from the material and the amount of material to be covered within a given time.

Figure 7:
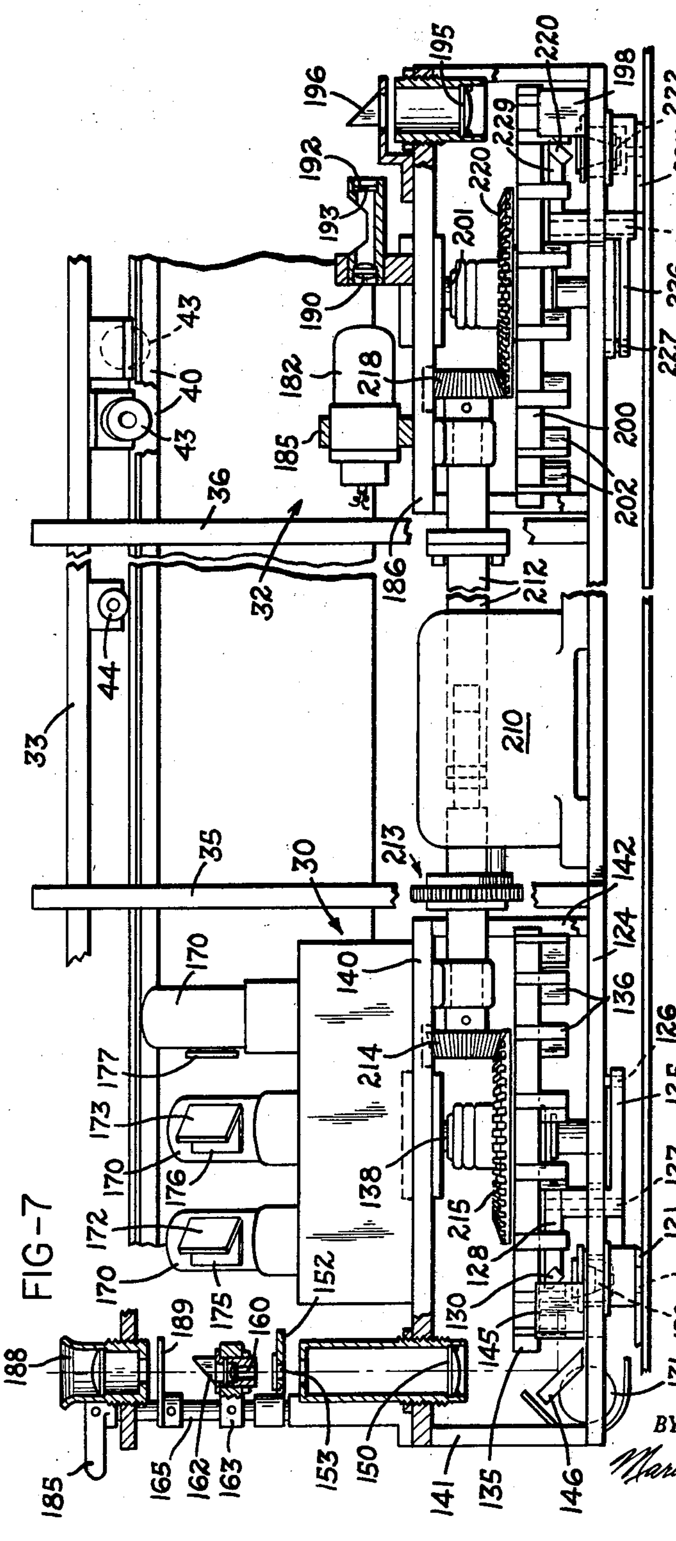
FIG. 7 is an elevational view, partially in section, and partially broken away, of the reading and recording heads of FIG. 6.
Figure 6:
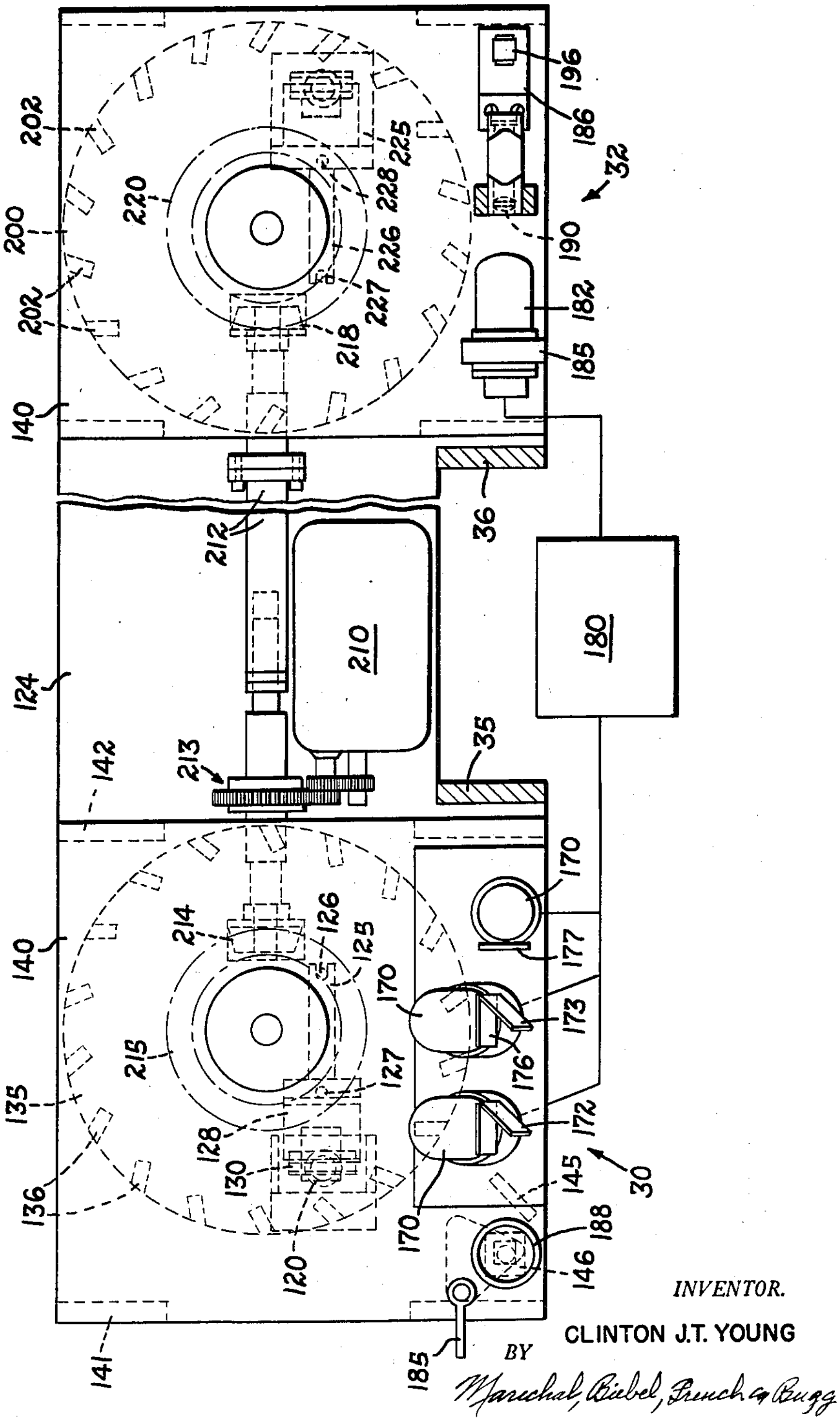
FIG. 6 is an enlarged plan view, partially in section, and partially broken away, of the reading and recording heads of the apparatus of FIG. 1.

The fast scanning system carried within the reading head 30 may be understood with reference to FIGS. 6 and 7. The overall arrangement of the rapid scanning system can be generalized as follows: The material being scanned is generally illuminated and is viewed by a pick-up lens which is positioned at its focal length from the material. A second lens refocuses this light on a surface in which there is formed a dissecting aperture. Between these two lenses the light is reflected from a rotating reflecting plane. This causes the image formed by the second lens to sweep across the dissecting aperture so that at any moment only light from one small element of the surface being scanned falls on the aperture. Means in the recording head is also included for detecting the light at the aperture and for suitably operating an electric circuit. To assist in following the relationship of the optical elements employed in this preferred embodiment of the invention, reference may be had to the diagram of FIG. 8 within which the essential optical elements are illustrated in a manner showing their interrelated function, and are shown as being unobstructed by the mechanical mounting arrangement within which they are, of necessity, associated.

The pick-up lens is shown at 120 in FIG. 7 as being mounted for limited vertical movement on a shoe plate 121 which has a viewing aperture 122 formed therein. The shoe plate 121 rides on the surface of the material being copied and maintains the lens 120 at a fixed distance from the material throughout small variations in the evenness or height of the material.

The shoe plate 121 and lens 120 move vertically within a suitable opening formed in a base plate 124. The base plate 124 forms a mounting plate for the heads 30 and 32 and is supported on the bar 33 by a connection at the lower ends of the hanger bars 35 and 36. The shoe plate 121 is formed with a rearward extension 125 arranged for guided vertical motion on the guide pins 126 and 127 and includes an upper arm 128 upon which is carried a reflecting mirror 130.

The pick-up lens 120 is preferably a photographic objective which is positioned by its focal length from the surface of the material being scanned and projects an image of a small portion of this surface at infinity. General illumination is provided by a lamp 131. The mirror 130 is positioned to have an angle of incidence of 45° in order to project the reflected image from the pick-up lens 120 at right angles parallel to the material being scanned.

A first rotating mirror means having a plurality of angularly disposed reflecting surfaces positioned to pass successively through the beam formed from the pick-up lens 120, as reflected by the mirror 130, includes the disk or wheel 135 within which a plurality of depending, angularly arranged mirrors 136 are mounted. The wheel 135 is mounted for rotation on a vertical shaft 138 extending between a mounting plate 140 at the top and the oppositely disposed base plate 124. The plate 140 is conveniently supported on the base plate 124 by spacers 141 and 142.

The mirrors 136 on the wheel 135 are mounted in a circle, the center of which is the center of rotation of the wheel. The light from the lens 120 and its associated mirror 130 is incident to the reflecting surfaces of the mirrors 136 from the side of the wheel toward the center of rotation. This can be seen in FIGS. 6 and 8 where the mirror 130 directs the beam from the lens 120 to the left, and the mirrors 136 pass successively through this beam which preferably carries an image formed at infinity by the lens 120. Thus, the mirrors 136 in the wheel 135 resemble a paddle wheel, since they are set at an angle to the radius so that the reflected light therefrom is outside of the circle swept by the mirrors.

The mirror 130 is provided for the convenience of folding the light from the pick-up lens 120 into a plane normal to the surface being swept since, having the light so incident to the mirrors 136, requires a radius of rotation of these mirrors which is larger than the focal length of the pick-up lens 120 and the distance from it to the mirrors 136. If the mirror 130 were not employed, this would require that the rotating wheel 135 and its associated mirrors be arranged to rotate through the beam of the pick-up lens on a horizontal axis and the mirrors 136, on the other side of their rotation, would sweep through and under the surface 21 of the table 20. This is impractical where the surface being scanned is of greater extent than the chord included inside the mirror circle, and this difficulty is removed by having the rotating mirror structure rotate parallel to the table.

The reflecting surfaces of the mirrors 136 therefore pass in succession through the image formed by the pick-up lens 120 and reflect this image outwardly to a vertically disposed mirror 145 which is arranged to direct the moving beam 90° from the mirrors 136 to an obliquely arranged mirror 146. The mirror 145 is best seen in FIGS. 6 and 8 and the mirror 146 is best seen in FIGS. 7 and 8. The latter mirror directs the moving image upwardly to a second lens 150, FIGS. 7 and 8. The lens 150 is thus positioned to lie in the path of the reflected light from each of the reflecting surfaces 136 of the wheel 135, and is arranged to focus the image carried thereby of the area 24.

Means defining a dissecting aperture lying in the focal plane of the second lens 150 for passing only a predetermined small portion or element 151 (FIG. 9) of this image consists of a plate 152 having formed therein a small aperture 153. The aperture 153 passes only a small portion of the moving image from the mirrors 136 on the wheel 135, resulting in the passage of a constantly changing portion of the area observed by the pick-up lens 120 as each of the reflectors 136 passes through the field of the pick-up lens.

In further explanation of the optical system described up to this point, since the objective or pick-up lens 120 is positioned from the scanning area by its own focal length, it forms an image at infinity. Light from any point on the area therefore leaves the lens 120 as a parallel bundle of rays, but the direction of the bundle depends upon the position of the object point assumed on the area being scanned. These bundles are therefore intercepted in succession by the scanning mirrors 136 which direct them into the second lens 150, for convenience by means of the intervening mirrors 145 and 146. To pass through the aperture 153, light must enter the aperture in one particular direction and this direction is taken as being parallel to the axis of the second lens 150, since the aperture 153 lies on the axis of the second lens 150. Since the beams from different object points along the scan leave the pick-up lens 120 in different directions, a given scanning mirror 136 on the wheel 135 can reflect light from a given point to reach the aperture 153 only when such mirror is at one particular angle in its rotation. As it rotates, it so directs light from successive object points or elements 151 which comprise one line 38 of the fine scan raster of FIG. 9. After one such line is complete, the rotation of the wheel brings another mirror 136 into working range and it, in turn, produces another line, etc.

It will be noted that the mirrors 136 of the wheel 135 pass through the beam between the two lenses 120 and 150, where by reason of these two lenses, both the object and the image are at optical infinity. Therefore, the change in path length by rotating mirrors does not affect the focus of this image.

It is within the scope of this invention to employ a rotating regular prism in place of the wheel 135 and mirrors 136. However, the use of such a prism is open to the objection that it introduces a considerable amount of dead time since the corner between adjacent prism faces must traverse the entire beam coming from the pick-up lens 120 before the following prism face reaches the correct angular position for beginning a new scan. The dead time between the operation of adjacent faces of a rotating prism may run higher than 30%. The arrangement of the mirrors 136 on the wheel 135 may be thought of as being equivalent to reflecting light from the inside, rather than the outside, of the faces of a regular prism. By this arrangement, it is possible to decrease the dead time between the movement of one mirror into the image after the previous mirror has left the image to an absolute minimum; and the mirrors may be arranged to follow one another so closely that precautions may be required to prevent two adjacent mirrors from being effective at the same time. Such precautions may consist of placing a window at the aperture 122 and blackening it almost up to each end of the scan for the purpose of reducing the size of the image traversed by the mirrors.

Optical-transducer means for detecting the image at the aperture 153 includes a collimating lens 160 and a reflecting prism 162 mounted on an arm 163 of a rotatable post 165. The lens 160 receives the image at the aperture 153 and prevents its spreading to a wide angle. Electrical pick-up means for receiving the light at the aperture and providing a signal may consist of photomultiplying tubes identified at 170. For instance, these tubes may be provided with light sharing mirrors 172 and 173 together with optical filters 175, 176 and 177 for the purpose of recognizing the occurrence of a particular color or colors in the element of the scan, and for providing an output signal upon the recognition of such color, in accordance with the color recognition system disclosed and claimed in the copending application of Young Serial No. 73,281, filed concurrently herewith and assigned to the same assignee as this application. Thus, one or more transducers 170 may be employed to receive the light at the aperture 153 for the purpose of suitably indicating the occurrence of desired areas on the material being scanned by the operation of an electric detection circuit which is indicated diagrammatically at 180 in FIG. 6. The signal from the circuit 180 may be employed to control or suitably modulate a light source, which may consist of the lamp 182 in the recording head 32.

The shaft 165 includes an operator's handle 185 by means of which the arm 163, with the lens 160 and prism 162, and the aperture plate 152 may be swung out of operative position to be replaced by an indexing glass 189 in order to provide for visual inspection by means of an eye piece 188. The indexing glass 189 includes cross hairs or index lines to indicate where the aperture 153 was. The eye piece 188 provides means by which the material at the reading area is observed while positioning the reading head. Thus, an operator may observe through the eye piece 188 the area at the element 151 at any particular time, provided the wheel 135 is held from rotation. The mirror 145 provides an additional function of correcting the observed image at the eye piece 188 to prevent it from being rotated a confusing 90° from the orientation of the material at the reading area 24.

The optical system of the recording head 32 is a substantial duplication of the optical system within the reading head 30, and operates to direct a modulated beam, consisting of a flying modulated spot, onto the surface of the recording area 25 in synchronism with the changing area defined by the dissecting aperture 153 of the reading head 30. The lamp 182 is secured by any convenient means, such as by a collar 185, to an upper mounting plate 186 of the recording head 32. The lamp 182 is preferably of any type which may be conveniently modulated or turned on and off at a rapid rate, such as a glow modulator lamp.

Light from the lamp is gathered by a condensing lens 190 which may be similar to the lens 160 in the reading head and is applied to a plate 192 including a dissecting aperture 193, similar to the aperture 153 in the plate 152. A lens 195, similar to the lens 150 in the recording head, is positioned from the aperture 193 by its focal length and has its barrel mounted for convenience within the upper plate 186. A reflecting prism 196 is interposed for the convenience of bending the light from the aperture 193 downwardly through 90°.

The lens 195 forms an image of the aperture 193 at infinity and projects a beam of this image downwardly to an obliquely slanted or positioned fixed mirror 198 mounted on the base plate 125. The mirror 198 is positioned to direct its reflected beam into the path of the rotating mirror structure including a wheel 200 and reflecting mirrors 202 mounted in depending relation therefrom, in the manner described in connection with the wheel 135 and mirrors 136. The wheel 200 is mounted on a shaft 201 for rotation between the plates 186 and 124. The wheels 200 and 130 each contain the same number of mirrors which are set at the same angle to the radius to insure that corresponding mirrors make the same angle with the light at any instant in the reading and recording heads. Actually, a certain amount of variation in the angle between adjacent mirrors on a given wheel can be normally tolerated as long as the positioned relationship of the particular one of the mirrors passing through the beam within the reading head and the corresponding mirror passing through the beam within the recording head with respect to the radius of the wheel is the same for each mirror.

Any convenient mechanical means may be employed for driving the wheels 135 and 200 in synchronism, and a convenient method of achieving this is means of a common electric motor drive 210, mounted on the plate 124. The motor 210 drives a transverse shaft 212 through suitable reduction gearing 213. A spur gear 214 is fixed at the left end of the shaft 212 and is meshed in engagement with a ring gear 215 mounted on the shaft 138 on the wheel 135. A similar spur gear 218 is mounted on the right-hand end of the shaft 212 and is in engagement with a similar ring gear 220 on the wheel 200. It is understood that the gears 214 and 218 and the gears 215 and 220 respectively include the same number of teeth to effect uniform rotation of each of the wheels 135 and 200, but in the opposite direction of rotation. The use of a single motor 210 and direct drive gearing, as described, obviates the requirement for electrical or other form of synchronous drive.

The beam of light reflected from the successive surfaces of the mirrors 202 is applied to the obliquely aligned surface of a small mirror 220, similar to the mirror 130, which directs this moving beam downwardly through an objective lens 222, similar to the lens 120 in the reading head, to form a moving spot of defined size on the area 25. Preferably, these lenses comprise a matched pair. Means positioning the lens 222 by its focal length from the recording area includes a shoe plate 225 which is mounted for limited vertical movement in the vertical plane. The shoe plate 225 includes a rearward extension 226 which is slidably mounted on a pin 227 and a central body portion mounted on a stationary pin 228. The reflector 220 is also mounted for movement with the lens 222 on an arm 229 forming an integral extension of the foot plate 225. Thus, the flying spot of light generated by the mechanism within the recording head 32 follows and traces a pattern onto the recording area which forms an exact duplicate raster of lines corresponding in time and relative position to the lines scanned within the reading head 30.

It is within the scope of this invention to combine the functions of one or more of the motors 50, 75, or 210. For instance, the motor 210 may be employed for left-right traverse as well as for rotating the mirror structures in the recording and reading heads. It is also within the scope of this invention to employ mechanical or other means for modulating the light beam within the recording head, such as the employment of a shutter arrangement between a constantly illuminated lamp and the dissecting aperture 193, where the frequencies of response permit the use of such a mechanical shutter or a Kerr cell or other means.

In the operation of this invention, it is usually desired to adjust the controls of the circuit 180 in order to effect the desired recording at the recording area 25 upon the occurrence of a particular optically discernible characteristic of the material at the reading area 24. This may be, for instance, the occurrence of, say brown ink or other surface color or contrast on the surface of a map, and the color recognition system described and claimed in the copending application of Young, above, is particularly suited for the purpose of recognizing the occurrence of preselected colors. Accordingly, the solenoids 96 and 105, and 106 of the indexing bars 90 and 100 may be manually operated so as to disengage the indexing bars and permit freedom of movement along the crossways 64 and 70 from front to back. The main way motor 50 may also be manually operated for the purpose of positioning the reading head 30 and, in particular, the field of the lens 120 over the material at the reading area 24 to the point at which the desired color occurs. The motor 210 is not operated at this time, but the operator observes the material at the area 24 through the eye piece 188 by swinging the handle 185 which carries the collimating lens 160 reflecting prism 162, and plate 152 out of view. The operator may then observe directly the material at the reading area 24.

The operator may then rotate the wheel 135 by hand until the cross hairs of the indexing glass 189 fall on the desired color, which is to be recognized by the illumination of the lamp 182 to cause recording thereof on the photographic material at the recording area 25; and the controls of the circuit 180 may be suitably adjusted in order to effect such recognition with the handle 185 returned to the operative position. The carriage 33 is then returned to a suitable starting position with respect to the material on the reading area 24 and the indexing bars are permitted to re-engage their respective pawls for locating the main way in a starting position. The unit is then permitted to operate on automatic operation, with the limits of left and right travel being suitably adjusted by the positioning of the limit switches 58 and 59.

Automatic operation preferably includes the continuous operation of the motor 210 to drive the mirror wheels 135 and 200 continuously through the shaft 212 and the bevel and pinion gearing at the opposite ends thereof. The shoe plates 121 and 225 ride respectively over the surfaces of the material being reproduced and the reproducing material with slight unevenness thereof being compensated for by the movement of the shoe plates in limited vertical direction. Preferably, the surfaces are protected by suitable transparent covers. Each time the desired surface characteristic is defined at the dissecting aperture 135, this is detected by the transducers 170 which form a part of the circuit 180 and cause the lamp 182 to be illuminated throughout the time that such desired characteristic is within the dissecting aperture 153. The illumination of the lamp 182 causes a spot of light to be applied to the recording medium at the recording area 25 at substantially the same relative position and at substantially the same instant in time. It is recognized that some time delay may occur within the electrical circuits connecting the optical-electrical transducers 170 of the reading head with the lamp 182 of the recording head, but such electrical delay is usually sufficiently small so that it may be neglected. However, it is within the scope of this invention to provide phase adjustment in the angular relation of the wheels 135 and 200 to compensate for any delay in the electrical circuit 180.

By way of specific example but in no way intending to limit the scope of the invention, the pick-up and recording lenses may be 15 mm. photographic objectives which are preferably matched by selection. The second lens 150 in the reading head and the lens 195 in the recording head may each have a focal length of 86 mm. thereby resulting in an image magnification of 86 divided by 15 or 5.72. If a scanning element 151 is desired of 0.002 inch square, the dissecting aperture may therefore be square and have a dimension at each side of 0.0115 inch due to the magnification.

For the purpose of visual observation, the eye piece 188 may contain another 86 mm. lens which acts as a simple microscope so that the image is viewed at a total magnification of 16.6 from the surface scanned. Since the aperture 193 is preferably, but not necessarily, of the same size as the aperture 153, the recording head produces a spot of light of 0.002 inch square.

Each of the wheels 135 and 200 may carry 18 mirrors, as indicated, which may be set at an angle of 28° from the radius. If the scanning wheels are rotated at 2.698 revolutions per second, this results in the generation of 48.56 scans per second. Each scan may be 0.4 inch long and therefore contain 200 scan elements 151, each of which is 0.002 inch on a side. With the specifications as cited above, the linear scannings speed is 19.42 inches per second which results in the viewing of 9,710 elements per second during the active part of the scan.

The rate of lateral traverse of the reading and recording heads along the width of the material is preferably chosen so that adjacent scanning lines are substantially contiguous to each other along the length of the band being scanned. In keeping with the example specified above, a rate of traverse of 5.75 inches per minute has been found satisfactory and results in a lateral movement of approximately 0.002 inch between adjacent lines, which is the width of the element being scanned. At this rate, a map of 22½ by 30 inches may be covered in approximately 5 hours.

The linear scanning speed is therefore controlled only by the angular velocity of the scanning wheels and the focal length of the lenses, so that the linear speed may be varied within considerable limits if warranted by other factors. Centrifugal forces on the rotating wheels do not become a significant factor until the speed is increased many times over that described in the above example.

While the method herein described, and the form of apparatus for carrying this method into effect, constitute preferred embodiments of the invention, it is to be understood that the invention is not limited to this precise method and form of apparatus, and that changes may be made therein without departing from the scope of the invention which is defined in the appended claims.

What is claimed is:

1. Apparatus for scanning a defined and constantly changing area of a surface comprising a moving reading head, a pick-up lens in said head positioned approximately at its focal length from said area to be scanned and forming an image thereof at infinity, means in said head movably mounting said lens including a portion riding on said surface providing for movement of said lens conforming to variations in the spacing between said surface and said head with relative movement therebetween, a plurality of reflectors angularly disposed on a rotatable wheel having surfaces arranged to pass successively through the beam from said lens upon the rotation of said wheel, a second lens in said head positioned to receive the reflected light from each of said surfaces and arranged to focus an image thereof, and means in said head defining a dissecting aperture lying substantially in the focal plane of said second lens for passing only a small portion of said image resulting in the passage of a constantly changing portion of said area as each said reflector passes through the field of said pick-up lens.

2. Apparatus for scanning a defined area of a surface comprising a pick-up lens positioned approximately at its focal length from said area and forming an image thereof, a plurality of angularly disposed rotatably mounted reflectors having surfaces arranged to pass successively through the beam from said lens with an incidence of light on a side toward the axis of rotation and being inclined to the radius of rotation to reflect said light outwardly of the axis of rotation of said reflectors, a second lens positioned to lie in the path of the reflected light from each said surface and arranged to focus an image thereof, and means defining a dissecting aperture lying substantially in the focal plane of said second lens for passing only a small portion of said image resulting in the passage of a constantly changing portion of said area as each said reflector passes through the field of said pick-up lens.

3. Apparatus for scanning a defined area of a surface comprising a pick-up lens positioned approximately at its focal length from said area and forming an image at infinity, a plurality of angularly disposed rotatably mounted reflectors having surfaces arranged to pass successively through the light from said lens with an incidence of light on a side toward the axis of rotation and being inclined to the radius of rotation to reflect said light outwardly of the axis of rotation of said reflectors, a second lens positioned to lie in the path of the reflected light from each said surface and arranged to focus an image thereof, means defining a dissecting aperture lying substantially in the focal plane of said second lens for passing only a small portion of said image resulting in the passage of a constantly changing portion of said area as each said reflector passes through the field of said pick-up lens, and means for detecting the image at said dissecting aperture.

4. A duplicating machine comprising a reading head and a recording head rigidly interconnected for concurrent movement respectively over a reading area and a recording area, lens means in said scanning head focused on said scanning area and projecting an image of a portion thereof, first rotating mirror means having a plurality of angularly disposed reflecting surfaces positioned to pass successively through the beam from said lens means, phototransducer means arranged to receive reflected light from said surfaces and operable to provide an output signal upon the occurrence of a given input, modulated light means in said recording head controlled by said transducer means, second rotating mirror means substantially identical in optical quality to said first mirror means, drive means for rotating each of said mirror means in synchronism, optical means arranged to project a beam of light from said light means onto successive reflecting surfaces of said second mirror means, and an objective lens positioned to direct the reflected beam from said second mirror means onto said recording area.

5. A duplicating machine comprising a reading head and a recording head rigidly interconnected for concurrent movement respectively over a reading area and a recording area, a pick-up lens in said reading head freely riding on the surface of said reading area and focused to project an image of a relatively small portion thereof, first rotating mirror means in said scanning head having a plurality of angularly disposed reflecting surfaces positioned to pass successively through the image from said pick-up lens, a dissecting aperture arranged to receive the reflected image from said first rotating mirror means and defining a small portion of said image, means in said read head responsive to light at said aperture, a light source in said recording head controlled by said light responsive means, second rotating mirror means similar in optical quality to said first mirror means, drive means for rotating each of said mirror means in synchronism, said light source arranged to project a beam of light onto successive reflecting surfaces of said second mirror means, and an objective lens in said recording head positioned to direct the reflected beam from said second mirror means onto said recording area.

6. A duplicating machine comprising a reading head and a recording head rigidly interconnected for concurrent movement respectively over a reading area and a recording area, a pick-up lens in said reading head focused on said reading area and projecting an image of a relatively small portion thereof, first rotating mirror means in said scanning head having a plurality of angularly disposed reflecting surfaces positioned to pass successively through the image from said pick-up lens, dissecting means arranged to receive the reflected image from said first rotating mirror means and defining a small portion of said image, light responsive means arranged to receive light from said dissecting means and to close an electric circuit, a light source in said circuit controlled by said light responsive means, second rotating mirror means in said recording head similar in optical quality to said first mirror means, drive means for rotating each of said mirror means in synchronism, second dissecting means arranged to project a small beam of light from said source onto successive reflecting surfaces of said second mirror means, and an objective lens in said recording head positioned to direct the reflected beam from said second mirror means onto said recording area.

7. A duplicating machine comprising a reading head and a recording head rigidly interconnected for concurrent movement respectively over a reading area and a recording area, a pick-up lens in said reading head focused on said reading area and projecting an image of a relatively small portion thereof at infinity, first rotating mirror means having a plurality of angularly disposed reflecting surfaces positioned to pass successively through said image, second lens means positioned to receive the reflected light from said surfaces at said image, a dissecting aperture positioned at the focal plane of said second lens means to receive the reflected beam from said first rotating mirror means and defining a small portion of said image, means in said recording head responsive to light signals at said aperture, a light source in said recording head controlled by said light signal responsive means, second rotating mirror means substantially identical in optical quality to said first means, common drive means for rotating each of said mirror means, a second dissecting aperture arranged to project a small beam of light from said source onto successive reflecting surfaces of said second mirror means, and an objective lens positioned to direct the reflected beam from said second mirror means onto said recording area.

8. A reproducing system for recording on the surface of recording material the information on the surface of source material, comprising means for supporting said recording and source material in spaced apart relation, a reading head, a recording head, means rigidly connecting said reading and recording heads in spaced apart relation corresponding to the spacing between said source and recording materials, a main traverse way supporting said heads for movement over said materials in one direction thereof, and means on said supporting means mounting said main traverse way for indexing movement into a plurality of fixedly spaced positions in a direction transverse to said one direction to effect transverse scanning and recording by said heads in a plurality of generally parallel paths, including a pair of notched bars and cooperating pawls adjacent each end of said main traverse way rigidly connecting each end thereof to said supporting means defining the limits of said fixedly spaced positions.

9. A parallel path reproducing system for recording on the planar surface of recording material the information on the planar surface of source material, comprising means for supporting said recording and source material in spaced apart relation, a reading head, means in said reading head forming fine line scanning apparatus for rapidly and repetitively scanning a narrow band, a recording head, means in said recording head forming fine line reproducing apparatus for reproducing on said recording material scanning lines corresponding in area to said band, a bar rigidly connecting said reading and recording heads in spaced apart relation corresponding to the spacing between said source and recording materials, a main traverse way supporting said bar and heads for movement over said materials in one direction thereof, and means on said supporting means mounting said main traverse way for indexing movement parallel to itself into a plurality of fixedly spaced positions corresponding to the width of said bands in a direction transverse to said one direction to effect transverse scanning and recording by said heads in a plurality of parallel paths.

10. A parallel path scanning and reproducing system for recording on the planar surface of recording material the information on the planar surface of source material, comprising a table having means thereon for supporting said recording and source material in spaced apart relation, a fine line scanning reading head for scanning a narrow band of said source material, a fine line recording head slaved to said reading head, a carriage bar rigidly connecting said reading and recording heads in spaced apart relation corresponding to the spacing between said source and recording materials, a main traverse way supporting said carriage bar and heads for movement over said materials in one direction thereof, means on said table supporting said main traverse way for movement in a direction transverse to said one direction, and indexing means defining a plurality of fixedly spaced positions of said bar and heads in said transverse direction including an indexing bar having a plurality of uniformly spaced notches thereon with the spacing of said notches corresponding to the width of said bands scanned by said heads and a cooperating pawl selectively movable into said notches.

11. The system of claim 10 including an electric motor, a transverse lead screw on said table, a nut on said lead screw in driving relation to said main way to move said way in said transverse direction, and a clutch interposed in driving relation between said motor and screw providing for slipping upon engagement of said pawl in one of said notches.

12. A processing system for reproducing on recording material an image of optically processed information derived from source material, comprising means for supporting said source and recording material in spatial relation, optical reading means and controllable optical recording means mounted together in spatial relation corresponding to the spaced apart distances of said materials, program means supporting said reading and recording means and providing for movement thereof together in a predetermined pattern to scan said materials, optical fine line scanning means in said reading means, optical fine line reproducing means in said recording means connecting to said line scanning means for slaved operation therewith, and processing means connected to receive a line scanned image from said reading means and operable upon the occurrence of a particular characteristic thereof to control said recording means in response to said characteristic occurrence to effect recording of the image of the position of said characteristic as it appears in said source material.

13. The reproducing system of claim 8 further including manually operable means for disengaging said pawls and said notched bars permitting adjustment of said heads unrestricted by said pawls and bars in relation to said source material.

14. Scanning apparatus for scanning a defined area of a surface, comprising a first lens positioned approximately at its focal length from said area and forming an image of a small portion of said surface at infinity, a rotatable member, a plurality of angularly disposed reflectors carried on said member each having reflecting surfaces arranged to pass successively through an image from said first lens, each of said reflectors forming a fixed angle to a radius drawn from the center of said member to the center of each said reflector so that said image when intercepted from an angle of incidence inclined toward said axis of rotation is directed outwardly away from said axis of rotation, and a second lens positioned to intercept the successive moving images from said reflector surfaces and forming a focused image of the constantly changing portion of said surface.

References Cited in the file of this patent

UNITED STATES PATENTS

| | | |
|---|---|---|
| 2,415,450 | Swann | Feb. 11, 1947 |
| 2,750,443 | Nyman | June 12, 1956 |
| 2,844,648 | Rosenthal | July 22, 1958 |
| 2,976,361 | Stamps | Mar. 21, 1961 |
| 2,976,362 | Stamps | Mar. 21, 1961 |